United States Patent [19]
Markarian et al.

[11] Patent Number: 5,885,328
[45] Date of Patent: Mar. 23, 1999

[54] METHOD OF AGGLOMERATING OIL-CONTAINING STEEL MILL WASTE

[75] Inventors: Kegham M. Markarian, University Heights; James P. Morgan, Strongsville, both of Ohio

[73] Assignee: LTV Steel Company, Inc., Cleveland, Ohio

[21] Appl. No.: 646,832

[22] Filed: May 31, 1996

[51] Int. Cl.[6] .................................................. C22B 1/242
[52] U.S. Cl. ........................... 75/770; 75/10.66; 75/484; 75/772; 75/773; 75/961; 75/962
[58] Field of Search ............................ 75/433, 961, 962, 75/767, 768, 770, 772, 773, 10.66, 484, 571, 506

[56] References Cited

U.S. PATENT DOCUMENTS

| | | |
|---|---|---|
| 3,615,350 | 10/1971 | Evers . |
| 4,119,455 | 10/1978 | Cass et al. ................................ 75/773 |
| 4,123,257 | 10/1978 | Fukuoka et al. . |
| 4,177,062 | 12/1979 | Pack . |
| 4,189,314 | 2/1980 | Fiege ........................................ 75/571 |
| 4,326,883 | 4/1982 | Schwarz . |
| 4,585,475 | 4/1986 | Fosnacht .................................. 75/962 |
| 5,047,083 | 9/1991 | Blake et al. . |

FOREIGN PATENT DOCUMENTS

| | | |
|---|---|---|
| 4104072 | 8/1992 | Germany . |
| 60-96730 | 5/1985 | Japan . |
| 63-121624 | 5/1988 | Japan . |

OTHER PUBLICATIONS

Industry Week, Jun. 10, 1974, pp. 44 and 46, "Recycling mill sludge—profitably".
Iron Age, Jul. 2, 1979, pp. MP–8 and MP–9, "Stainless Waste Recovery Uses Coal–Based Reduction".
I&SM, Apr. 1981, "Recycling of ferrous steel plant fines, state-of-the-art", authored by Donald R. Fosnacht, pp. 22–26.
Pat Report, vol. 9, No. 7, Jul. 1975, pp. 624 and 625, "Steel industry sludge is being reused".
Journal WPCF, vol. 45, No. 10, Oct. 1973, pp. 2136–2145, "Treatment of oily wastes from a steel mill", Donald R. Woods and Murray W. Slezak.
Verlag Chemie GmbH, D–6940 Weinheim, 1984, *Erzmeetall* 37 (1984) No. 6, W. Kaas; Walzzunderschlamme, pp. 302–305, "Handha bung von Walzzunderschlammen". Month Unavailable.
Civil Engineering –ASCE, Jun. 1980, pp. 102 and 104, "Republic Steel recycling 80% of steel–mill wastewater".
Conservation & Recycling, vol. 8, No. 3/4, pp. 359–362, 1985, Stanley V. Margolin, "Steel Mill Residue Recycling Processes". Month Unavailable.
CMP Report No. 94–3 submitted in its entirety,, The EPRI Center for Materials Production, "Microwave Separation of Oil–Water Sludges 1: Application to Industrial Waste Sludges", Mar. 1994, Prepared by David A. Purta.
*Conservation & Recycling*, vol. 8, No. 3/4, pp. 377–381, 1985, Richard P. DeFilippi, "Removal of Organics From Recycled Materials". Month Unavailable.
Handbook of Adhesives, second edition, Irving Skeist, copyright 1977, pp. 212–221. Month Unavailable.

*Primary Examiner*—Melvyn Andrews
*Attorney, Agent, or Firm*—Watts, Hoffmann, Fisher & Heinke, Co., L.P.A.

[57] ABSTRACT

A method of agglomerating oil-containing steel mill waste includes the step of combining a first steel mill waste component with a second steel mill waste component to form a mixture. The first waste component includes substantially dry non-oily steel mill waste and the second waste component includes oil-containing steel mill waste. The first waste component and the second waste component are agglomerated.

22 Claims, 1 Drawing Sheet

PELLET BED AND GAS TEMPERATURE PROFILE IN RHF

METHOD OF AGGLOMERATING OIL-CONTAINING STEEL MILL WASTE

FIELD OF THE INVENTION

The present invention relates to a method of agglomerating oil-containing steel mill waste and, in particular, to a method of agglomerating the waste for use in processes that can reclaim iron values from the waste.

BACKGROUND OF THE INVENTION

Waste that contains iron values is generated at various locations of a steel plant during the processing of iron and steel. This waste material, which is commonly known as "revert," consists primarily of iron oxides. It is highly desirable that this waste be recycled to recover its iron value content, which may exceed 40 percent by weight. The dusts and sludges from the blast furnace and the basic oxygen furnace, and the sludges and mill scale from the rolling mill are particularly desirable for recycling purposes.

It is advantageous to convert steel mill waste into usable iron, inert slag and a relatively small amount of waste. This is not economically feasible unless all waste material that is generated in the plant is used, including oil laden sludge generated from flat rolling operations. Non-oily waste from the steel plant may be prepared in a sinter plant for use in a blast furnace. However, it is difficult to recycle oily steel mill waste. Steel mill waste that contains relatively large quantities of oils and greases cannot be recycled using sinter plants because volatilized oils and greases are not permitted for release to the atmosphere under EPA regulations and can cause fires in electrostatic precipitators used in the sinter plants.

Rolling mill scale when contaminated with oil from machinery is the primary source of oily waste in the steel mill. Such waste can be especially valuable in that it may contain about 60 to 75 percent by weight of iron. However, this residue is difficult to recycle due to its oil content. The oil in contaminated mill scale comprises about 10% of all the lubricants brought into a steel mill, and only about half of all oily sludge (contaminated and uncontaminated) can be processed by the sinter plant. Filippi, *Removal of Organics from Recycled Materials*, Conservation & Recycling, Vol. 8, No. 3/4, pp. 377–381, 1985.

In a hot strip rolling mill, a heated slab, sheet, bloom, billet or bar is passed between a series of rolls to reduce the thickness of the steel. In the rolling mill the hot steel is exposed to oxygen in the air as well as pressurized wash water on the entire surface of the steel as it is being rolled. This forms a layer of oxides on the steel, which must be removed before each successive rolling. Coarse scale removed at this stage is referred to as "mill scale."

As the steel is rolled in cold reduction a scale layer is mechanically broken away from the steel or is chemically removed by acids in a pickling process. The layer of scale is replaced by another layer every time the size or the shape of the steel is changed. When the scale is removed from the steel, it falls into a sewer in which high velocity water is flowing. Lubricating greases and oils from the rolling machinery and other mill debris join the water and scale material in the sewer to form an oily sludge.

Steel plants have disposed of oily steel mill waste, for example, by dumping it on-site in a controlled or regulated area or by shipping it to a waste site. Collection facilities have been used including settling pits and basins for removing oily waste from sludge so that water from the sludge can be reused or discharged. This conventional approach has limited prospects for reusing the oily waste and has created environmental problems in landfills.

Various methods have been proposed for recycling the oily sludge. For example, deoiling methods have been proposed that include a thermal kiln deoiling technique and a washing technique. The products of these processes are used in sintering operations. Solvent washing systems for removing the oil from the waste have also been proposed. Researchers are currently investigating the use of microwaves to separate oil from sludges. These methods are disadvantageous in that they have limited effectiveness, are generally not cost effective and may create new environmental problems.

Attempts have been made to recycle oily sludge by combining the oily sludge with sludges having substantially no oil or a low oil content. However, all of these attempts have been unsuccessful in mixing oily and substantially non-oily sludges together to form pellets of sizes amenable for use in various reduction processes.

To recover iron values from revert material, the material is agglomerated mechanically in a rotating disc or drum pelletizer in a manner known to those skilled in the art, in order to produce pellets of a particular size for the various reduction processes. The iron oxides in the pellets are then reduced to iron by one of a number of processes known to those skilled in the art.

One such reducing process commonly known as FAST-MET uses a rotary hearth furnace to produce a direct reduced iron product. Coal is used as the reductant. The coal is added to the revert material to provide the reductant within the pellet. In another process known as cold bonded agglomeration, a bond for the revert material is provided by cement or a combination of cement and other material. In this agglomeration process no elevated temperatures are used, thus no lead, zinc, or other materials are eliminated from the revert. The agglomerated material is reduced in the blast furnace. Thus, the bond fails in the high temperature reducing atmosphere of the blast furnace.

Yet another example of a process used for reducing revert material is known as the INMETCO process. While the revert material normally contains carbon from the blast furnace waste, additional amounts of carbon in the form of coke may need to be added during the pelletizing process. The pellets are processed in a reducing atmosphere in a rotary hearth furnace for removal of tramp elements that are unwanted for iron and steel production, such as zinc, lead, chlorides and alkalis. The details of the INMETCO process are provided by the following publications, which are incorporated herein by reference in their entirety: *Recycling of Iron and Steelworks Wastes Using the INMETCO Direct Reduction Process*, Reprint from MPT-Metallurgical Plant and Technology, No. 4/1990; Pargeter et al., *Ironmaking Using the INMETCO Process and Related Technologies*, Ironmaking Proceedings, Vol. 44 1985; and Pargeter et al., *Recycling of Waste and Flue Dust from the Steel Industry into Hot Metal Using the INMETCO Process*, Proc. 44th Electric Steelmaking Conf., ISS-AIME Dallas, pp. 403–408 1986.

The INMETCO process will now be described by the following text from the article, Bauer et al., *Recycling of Iron and Steelworks Wastes Using the Inmetco Direct Reduction Process*, Reprint from MPT-Metallurgical Plant and Technology, No. 4, pp. 1–6 (1990).

"Recycling of high iron content iron and steelworks wastes to achieve reusable products is technically and economically feasible using the Inmetco direct reduction process. A solution achievable at relatively short notice is therefore now available for the urgent problems of waste management.

In this process, all oxidic dusts, sludges and oil-containing scale occurring in iron and steelworks are processed to green, carbon-containing pellets and then reduced to a high iron and low tramp element containing sponge iron at temperatures of around 1250° C. in a rotary hearth furnace. Zinc, lead and cadmium are expelled nearly completely and converted to a highly-concentrated heavy metal containing secondary dust. These heavy metals can be recovered from this dust without any further concentration in the appropriate metallurgical processes. The hot sponge iron can be melted directly in a submerged arc furnace in its specific slag to achieve a low-sulphur hot metal suitable for charging into the LD steelmaking plant.

Iron-containing wastes occur in the production of hot metal and crude steel and in the processing of the crude steel to finished products. Such wastes comprise:

filter dusts and sludges from blast furnaces, steel plants and foundries;

oil-containing scales from continuous casters and hot rolling mills;

grinding dusts, sludges and pickling residues from steel treatment and processing;

iron shot from slag separation.

These fine-grained dusts and sludges contain heavy metals, alkalis, sulphur compounds and, to a certain extent, oil. It is possible either only to a very limited extent or, not at all, to recycle them via the primary production processes, since their aggregate state and the impurities contained would impose on such primary processes burdens ranging up to complete impracticability. At present, the majority of such wastes is still dumped. In future, special hazardous waste landfills will become necessary, due to the environmentally harmful tramp elements contained, such as zinc, lead, cadmium, chromium (6+) and oil; such facilities, however, do not offer an acceptable solution in the long term. Recycling of such wastes back into the primary processes will thus become mandatory. It is, furthermore, rational in terms of materials recovery.

The Inmetco direct reduction process is a suitable method for the solution of this problem. It is currently in use for recycling and recovery of chromium and nickel from steelworks wastes produced in the stainless steel industry, but can also be universally applied for the reprocessing of bulk steelworks wastes.

DESCRIPTION OF THE INMETCO PROCESS

The Inmetco direct reduction process, comprises two processing stages, i.e., production of green pellets and direct reduction in a rotary hearth furnace.

The addition of a submerged arc hot-metal melting furnace results in an overall technological concept which demonstrates in exemplary fashion the future path for the recycling of iron and steelworks residues and wastes.

A mixture of fine-grained oxidic materials and coal dust is processed to form green pellets on a pelletizing table and charged into the hot rotary hearth in two or three layers. The rotary hearth is peripherily heated in counterflow by means of gas and/or coal burners, the green pellets being heated to reduction temperature by means of gas-heating and wall radiation in the first third of the furnace. The predominant energy used for heating in this heating-up zone is the excess carbon monoxide obtained from the subsequent reduction zone. Reaction of the carbon present in the pellet with the oxides of iron and other metals starts when reduction temperature is reached, as shown in FIG. 1. The burners in the remaining two thirds of the furnace are operated substoichiometrically in graduated groups. A major portion of the energy required here is obtained by means of partial combustion of the carbon monoxide produced in reduction. Only a balancing portion of imported energy is therefore necessary in order to meet energy requirements for the heating-up and reduction process.

Thanks to the high furnace chamber temperatures of 1100° to 1350° C., the iron oxides contained in the pellets are metallized nearly completely during one revolution of the hearth, i.e., in less than 15 minutes. Carbon not consumed in reduction remains present in the sponge iron.

Initial C content in the green pellets can thus be used to adjust the C content of the sponge iron between broad limits of 1.5 and 10%, according to requirements for further processing. This is an important feature of the process.

During reduction the residual components zinc, lead, cadmium, and a portion of the alkalis, chlorides and fluorides are transferred to the flow of waste gas. Selective expulsion and low mechanical disintegration (<0.5%) result in a secondary dust with a high concentration of heavy metal oxides being captured in the waste gas filter; this dust appears particularly suitable for use as a starting material for recovery of these metals in specific metallurgical processes.

Phase separation and refining of the sponge iron extracted at approx. 900° C. can be performed in a hot-charged submerged arc hot-metal melting furnace. Non-metallic constituents in the wastes and coal ash are removed under reductive conditions using a slag system typical of the blast furnace. The furnace functions on the principle of electro slag resistance heating with an open pool of slag and energy input by means of Soderberg electrodes.

It is characteristic of melting in a submerged arc furnace that no problems with condensible phases (zinc, lead, alkalis), which are typical for the shaft furnace, occur and that low-loss energy conversion is achieved. Hot charging helps to balance out the additional input of energy necessary for melting-off the higher proportion of gangue and ash components present in this type of sponge iron.

The Inmetco process occupies a special position among the known carbon direct reduction processes. In contrast to the rotary kiln processes, for instance, the finely ground coal is permanently kept in intimate contact with the oxides to be reduced in the Inmetco process. This fact has far-reaching consequences on metallurgical and application potentials:

no thermal hardening of the pellets is necessary;

the wustite stage is traversed very quickly. The principal cause of sticking is thus absent;

the extremely high reduction temperatures result in correspondingly high degrees of metallization and practically complete evaporation of the heavy metals with exceptionally short reduction times, which, for their part, give rise to high specific throughputs;

reduction conducted in a motionless bed avoids fines formation (abrasion). The waste-gas dust ("secondary dusts") thus contains the evaporated heavy metals at high concentration levels;

the ash from the carbon sources cannot be removed from the product by magnetic separation. Therefore, it is not necessary to cool the sponge iron. Rather, the Inmetco product can be further processed 'in a single heat' in an energy-saving fashion. The occurrence of char requiring dumping is avoided;

the rotary hearth process is 'thermally and chemically decoupled'. The heat supply in the gas space determines heating-up and reduction rates without the latter having a feed-back influence on heat transmission and thus on the further course of reduction. The ease of access to the process cycle offered by the motionless furnace and short processing times permit simple process monitoring and control.

The following deals with the principle metallurgical aspects as delineated from laboratory investigations.

The mechanical properties of non-reduced and reduced pellets are influenced above all by integration of the carbon. Bulk densities and compressive strengths in the moist green pellets range between 1400 and 1600 kg/m$^3$ and 1 to 4 daN/pellet, respectively, depending on C-content and pellet size. The moist pellets can be plastically deformed and survive their drop into the rotary hearth. Disintegration due to thermal shock (decrepitation) is avoided by adding 1 to 3% binder.

Iron oxide reduction commences with the start of the Boudouard reaction: it is therefore dependent on the reactivity of the participants in the reaction. Intimate contact between the iron oxide and coal and their high specific surface areas within the green pellet provide ideal conditions for the early inception and rapid progress of reduction. This is confirmed by the extremely short reduction times of <15 minutes and degrees of metallization of >90%. Oxygen depletion commences at approximately 900° C. when coke breeze is used as reduction agent. High conversion rates are achieved as from 1100° C. These figures shift downwards (lower temperatures) when highly reactive coals are used.

Since no problems occur with dust and sticking, the reduction temperature can be raised practically at will if necessary, provided the inception of carburization in metallic iron does not cause formation of large quantities of liquid iron, which may occur above 1300° C.

The carbon not consumed in reduction remains in the sponge iron pellet. The C content in the sponge iron can thus be varied within broad limits and harmonized with the requirements of further processing by adjusting the initial composition of the pellets. The carbon contained in some types of steelworks wastes can be completely exploited for reduction. The combination of wastes containing a carbon surplus (e.g. hydrocyclone sludge from blast furnaces) with low-carbon dusts makes it possible to produce pellets which are autonomous with regard to reduction and tramp element evaporation and require no additional input of reduction agents.

The extremely short reduction times result in high specific throughputs, despite the limited number of pellet layers in the furnace; specific hearth area productivities of around 100 kg sponge iron/m$^2$h, or 1.6t/m$^3$d derive at layer depths of up to 32 mm together with degrees of metallization significantly above 90%.

Expulsion of heavy metals occurs simultaneously with iron oxide reduction. The degrees of zinc evaporation and iron metallization are of approximately the same numerical value at the advanced stage of the process. Lead expulsion is even higher. At 90% iron metallization it can be stated with certainty that more than 90% of the zinc and lead contents have been expelled. Alkali evaporation depends on temperature, the basicity of the pellets and the residence time in the furnace, and achieves figures of between 30 and 60% at the completion of iron reduction, according to boundary conditions.

After reduction, the pellets may contain in excess of 60% iron. The iron pellets may then be melted in a submerged electric arc furnace in a smelting process to produce molten iron and inert slag. The molten iron is transported to a basic oxygen furnace for steelmaking, and the inert slag is conditioned and disposed of as road construction material. Dust captured from the smelting process is recycled.

SUMMARY OF THE INVENTION

The present invention is directed to a method of agglomerating oil-containing steel mill waste to produce a material from which the iron values, which might otherwise be lost, can be recovered. The method of the present invention enables agglomeration of the oil-containing steel mill waste by combining it with substantially dry non-oily steel mill waste.

In general, a method of agglomerating oily steel mill waste according to the invention includes the step of combining a first steel mill waste component with a second steel mill waste component to form a mixture. The first waste component includes substantially dry non-oily steel mill waste and the second waste component includes oil-containing steel mill waste. In particular, the waste components are generated by operation of a blast furnace, a basic oxygen furnace and rolling mills from their respective water treatment facilities. The first waste component and the second waste component are agglomerated. Both the first waste component and the second waste component are able to be agglomerated because the first waste component has a moisture content that is predetermined in accordance with the present invention.

In preferred form, the method of the invention includes the step of drying the first waste component to a moisture content not greater than about 5% by weight. The waste components are added in amounts ranging from about 1:5 to about 1:3 parts by weight of the second waste component to the first waste component.

Other materials may be added to the mixture. For example, a binder may be added to the mixture to improve the green strength of pellets formed from agglomerating the mixture. Also, additional steel mill wastes such as dust or oily sludge may be added to the mixture. The waste material mixture may be pelletized to form pellets of at least ⅛ inch in size and, more preferably, from ⅜ to ½ inches in size.

The predetermined moisture content of the dry waste is selected to produce pellets having a suitable size for the subsequent reduction processes. For example, for the most efficient reduction of the green pellets in the INMETCO process, the pellets have a size ranging from ⅜ to ½ inches. Moreover, all of the reduction processes require the pellets to have uniform chemistry and sufficient green strength. To meet these requirements, raw material conditioning and pellet forming operations are equally important.

In the present invention, it has surprisingly been found that when the dry non-oily waste having less than about 5% by weight of water is mixed with the oily waste, oil coated particles tend to coat dry particles and promote mixing and subsequent agglomeration. Thus, the present invention succeeds where prior attempts have failed and enables oily waste and substantially non-oily waste to be combined to produce pellets of sizes suitable for subsequent reduction. By combining the oily waste with the dry non-oily waste having a moisture content prescribed by the invention, the mixture is able to be agglomerated to advantageously form pellets ranging from ⅜ to ½ inches in size. The pellets also possess sufficient green strength for use in the reduction processes. That is, the green pellets have a strength that allows them to withstand being dropped from certain heights such as on conveyors used in the reduction processes.

The method of the present invention thus advantageously enables the size of the pellets to be controlled by determining the moisture content of the dry non-oily waste. Another advantage of the present invention is that since the pellets contain oil from the oily sludge, some of the outside fuel sources required for the reduction processes may be conserved.

The method of the present invention is also directed to recovering the iron values from the pellets. This is achieved by reducing iron oxides of the pellets to iron in one of the reducing processes. In addition, the reduced pellets may be melted for use in making steel.

Other embodiments of the invention are contemplated to provide particular features and structural variants of the basic elements. The specific embodiments referred to as well as possible variations and the various features and advantages of the invention will become better understood from the detailed description that follows, together in connection with the accompanying drawings.

DETAILED DESCRIPTION OF PREFERRED EMBODIMENTS

Figure 1:
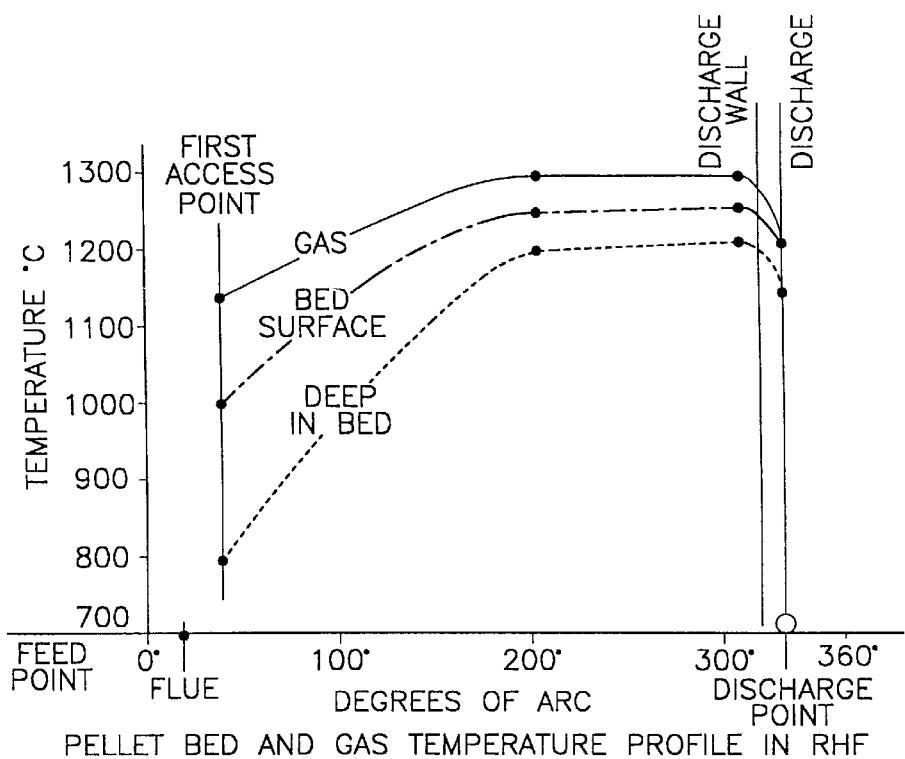
FIG. 1 is a graph showing a pellet bed and gas temperature profile in a rotary hearth furnace.
Figure 2:
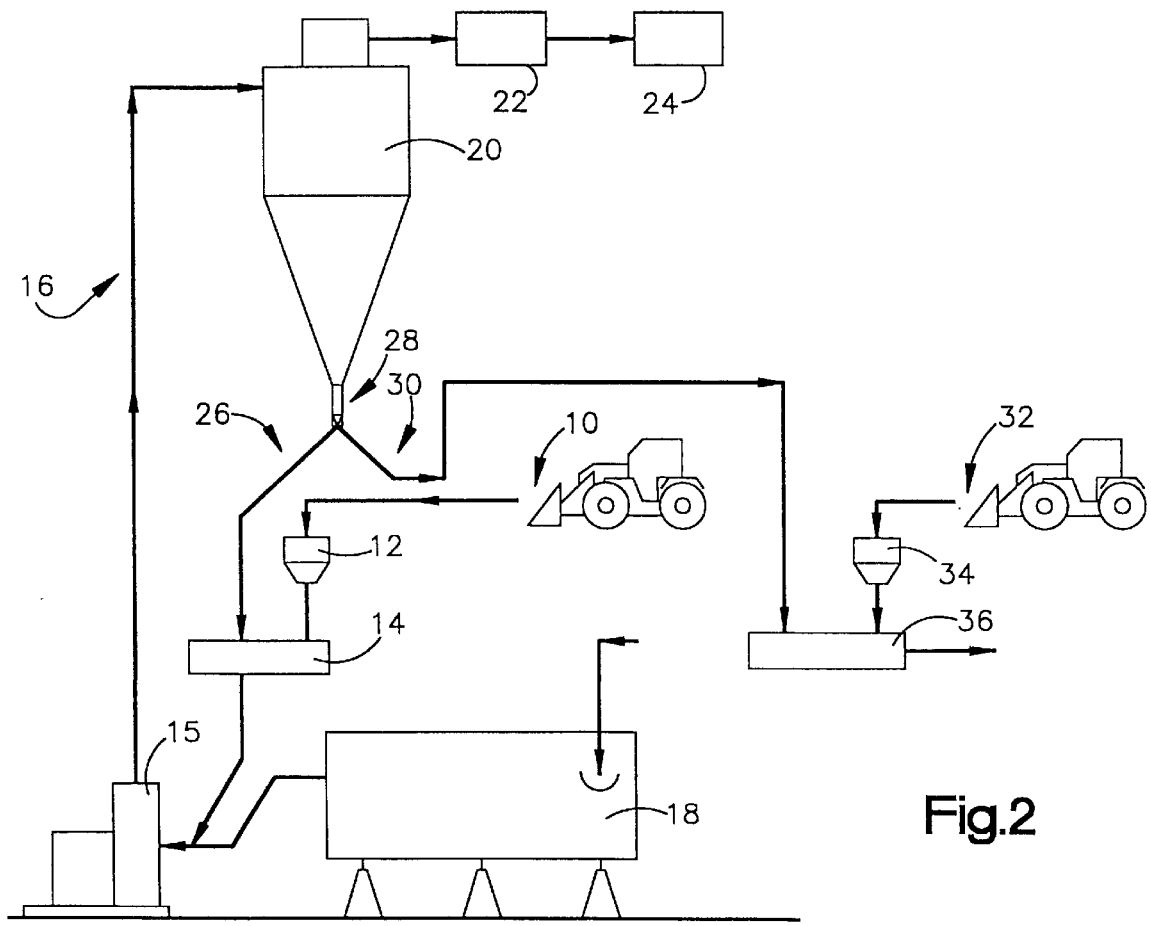
FIG. 2 is a schematic view of a process for agglomerating oil-containing steel mill waste according to the present invention.

A method of agglomerating oil-containing steel mill waste according to the invention includes the step of combining dry non-oily steel mill waste and oil-containing steel mill waste to form a mixture. The dry non-oily waste has a moisture content sufficient for agglomeration of both the dry non-oily waste and the oily waste. The waste mixture may contain any amount of the dry non-oily waste and the oily waste in which suitable agglomeration of the waste will occur, but preferably contains these waste materials in amounts ranging from about 1:5 to about 1:3 parts by weight of the oily waste to the dry non-oily waste.

Other materials including remaining revert material such as dusts and mill scale may be added to the mixture. Any suitable binder can be added to the mixture. The binder may comprise clay, organic material, or a combination thereof. Examples of suitable binders may be found in the publication, *Handbook of Adhesives*, 2d Ed., pp. 212–221 1977, which is incorporated herein by reference. One suitable binder is bentonite, which is a complex, naturally occurring Wyoming and Utah clay containing a relatively high proportion of the clay mineral montmorillonite. Another suitable binder is the organic adhesive, carboxymethyl cellulose.

The mixture is then charged in a pelletizer. Any pelletizer known to those skilled in the art in view of the instant disclosure may be used in the present invention. The pelletizer agglomerates the waste to form pellets of preferably at least ⅛ inch in size, more preferably ranging from ⅜ to ½ inches in size.

For recovering the iron values of the revert, one of the various reduction processes is used. In the reduction process, the pellets are exposed to a reducing atmosphere to convert the iron oxides in the pellets to iron. In the present invention, since the pellets contain oil from the oily sludge, some of the outside fuel sources required for the reduction processes may advantageously be conserved. Once the pellets have been reduced they may be melted in a smelting operation and used in the basic oxygen furnace to make steel.

Various types of waste materials are produced by a steel plant. The following Table I shows the primary sources of waste material in a typical steel mill, and shows the typical distribution of each type of waste based upon moisture content, in percent by weight. In Table I, the term "dry" refers to a moisture content of 2% by weight or less.

TABLE I

| Waste Material | % of Total Wet Steel Mill Waste | % of Total Dry Steel Mill Waste |
|---|---|---|
| Blast Furnace Dust | 20 | 25 |
| Blast Furnace Sludge | 20 | 21 |
| Basic Oxygen Furnace Dust | 7 | 9 |
| Basic Oxygen Furnace Sludge | 29 | 23 |
| Rolling Mill Sludge | 12 | 6.5 |
| Mill Scale | 12 | 15.5 |

All of the wastes from the mill, for example, waste from the blast furnace, the basic oxygen furnace, the rolling mill and mill scale waste, may be categorized as one or more of the following: non-oily sludge, oily sludge, dust and mill scale. The following Table II provides information as to the distribution of these categories of waste in a typical steel plant based upon moisture content, in percent by weight. In Table II, the term "dry" refers to a moisture content of 2% by weight or less.

TABLE II

| Waste Material | % of Total Wet Steel Mill Waste | % of Total Dry Steel Mill Waste |
|---|---|---|
| Non-oily Sludge | 49 | 44 |
| Oily Sludge | 12 | 6.5 |
| Dust | 27 | 34 |
| Mill Scale | 12 | 15.5 |

As Table II shows, the amount of oily steel mill waste is substantial. Oily sludge comprises twelve percent of the total amount of wet steel mill waste and 6.5% of the total amount of dry steel mill waste.

The moisture content of the non-oily waste is important in the method of the invention. In the present invention, the non-oily waste is typically wet and is preferably dried in the flash dryer. Dry non-oily waste that is separate from the wet non-oily waste may be added to the oily waste directly without drying. However, it may be difficult to selectively obtain dry non-oily waste.

The moisture content of the non-oily waste is predetermined to enable the non-oily waste and the oily waste to agglomerate to produce pellets of a particular size during the pelletizing process. The sizes of the pellets are selected based upon the requirements of the subsequent reduction process. For reduction in the INMETCO process, for example, the moisture content of the non-oily waste is selected so that agglomeration produces pellets of preferably at least ⅛ inch in size and, more preferably, pellets ranging from ⅜ to ½ inches in size. The moisture content of the non-oily waste is important in that it controls the mixing capabilities of the steel mill waste. If the non-oily waste is not dried or in a dry form, the oily waste material will not agglomerate with it sufficiently during the pelletizing process.

Although not wanting to be bound by theory, it is believed that oil coated particles in oily waste have an affinity for other oil coated particles rather than for the water coated particles that are present in wet non-oily waste. When dry non-oily waste rather than wet non-oily waste is mixed with the oily waste, the oil coated particles from the oily waste tend to coat the dry particles from the non-oily waste, which promotes mixing and subsequent agglomeration.

In most applications, the oil content of the oily waste may be as high as 25% by weight. At this oil content, oil is not believed to detrimentally affect the ability of the non-oily waste and the oily waste to mix with each other. As long as the moisture content of the dry waste is preferably about 5% by weight or less, the waste materials will agglomerate adequately during pelletizing. For example, the waste material will agglomerate to form pellets of at least ⅛ inch and, preferably, pellets ranging from ⅜ to ½ inches in size.

In the method of the present invention, wet non-oily waste material 10 is transported to a feeder 12 and then into a pug mill 14. Any feeder that permits the feed rate of the material to be accurately controlled may be used for the feeder 12. To this end, a suitable feeder is a combination feeder and storage or surge bin referred to as a feeder. The wet non-oily waste is then fed into a cage mill 15 of a flash dryer 16. The cage mill 15 breaks up the material for exposure to high velocity hot air from an air heater 18. The air heater 18 has an oil or gas burner and directs the high velocity hot air to the cage mill 15. The material travels from the cage mill 15 to the top of a cyclone 20. A fan 22 causes fine particles and gas to be transferred to a baghouse 24. The cyclone 20 separates entrained solids out of the gas.

In a continuous process, the wet non-oily waste feed material 10 is joined in the pug mill 14 by material 26 that has been dried in the flash drier 16. When the dried waste material passes through a dry divider 28 of the cyclone 20, a metered portion of the dried material 26 is fed back into the flash dryer system to enhance the mixing and drying process. Other dried waste material 30 is transferred out of the flash drier system 16 for mixing with oily waste material 32.

As an example of suitable parameters for flash dryer operation, a non-oily sludge 10 obtained for drying in the flash drier 16 had a moisture content in the range of 30–32% and was fed into the feeder 12. The inlet temperature of the cage mill was about 1100° F. After enough dry material was generated in the cyclone 20, about 65% by weight of the dried material was fed back into the pug mill 14 to render the process continuous. The moisture level of the material in the pug mill 14 was preferably less than about 15% by weight to avoid overloading the cage mill 15. Thus, the moisture dispersion necessary for proper operation of the cage mill 15 was dependant upon the consistency of the mixture in the pug mill 14. The feeder 12 provided moisture uniformity of the sludge 10 prior to feeding it into the pug mill 14.

The rate of water removal by the flash drier 16 was preferably about 26% of the total sludge weight per unit time. The moisture of the final dried material was about 1.0 to 1.5% by weight. The bulk of the dried material had a fine particle size of less than 250 microns. The amount of dust collected in the baghouse 24 was in the range of about 2 to 3% by weight of the total amount of dried material.

In the method of the invention, once the non-oily waste 30 has been dried in the flash dryer 16, it is suitable for mixing with the oily steel mill waste 32. The oily waste 32 has an oil content of, for example, about 16% by weight, and is typically wet. The oily waste 32 is transported to a feeder 34, which may be a combin feeder of the same type as the feeder 12, and is then mixed in a pug mill 36 with the dry waste material 30. The oily waste material 32 and the dry waste material 30 are preferably mixed together in the pug mill 36 in amounts ranging from about 1:5 to about 1:3 parts by weight of oily waste to dry non-oily waste. The wastes are added together in these amounts because this represents a range of availability of non-oily and oily waste in a typical steel plant. However, it will be appreciated by those skilled in the art in view of this disclosure that other proportions of dry non-oily waste and oily waste may be used.

After the oily waste is mixed with the dry non-oily waste in the pug mill, the mixture is preferably loaded into storage bins for transport. The mixture may then be pelletized and the iron oxides of the material reduced to iron, by one of the reduction processes known to those skilled in the art. After the iron oxides of the pellets have been reduced to iron, the pellets are melted in a submerged electric arc furnace by the smelting process. The molten iron may then be transported to a basic oxygen furnace for the steelmaking process.

The following Table III shows exemplary pellet compositions. The amount and type of binder in these compositions is selected to provide the pellets with sufficient green strength. Reference to "green" pellets herein means the condition the pellets are in when discharged by a pelletizer. Thus, "green strength" refers to the strength of green pellets. The percentages of bentonite and carboxymethyl cellulose binders shown are in percent by weight.

TABLE III

| Ex | Dry Sludge | Oily Sludge | BOF | BF | Mill Scale | Binder |
|---|---|---|---|---|---|---|
| A | 50 | 20 | 20 | 10 | — | water |
| B | 50 | 20 | 20 | 10 | — | 2% bentonite |
| C | 50 | 20 | 20 | 10 | — | .5% carboxymethyl cellulose |
| D | 50 | 10 | 17 | 18 | 5 | .2% carboxymethyl cellulose |
| E | 50 | 10 | 17 | 18 | 5 | .2% carboxymethyl cellulose and 1% bentonite |

The following Table IV characterizes the dry sludge used in the pellets of Table III by particle size distribution. The dry waste material had a moisture content of 2.42% and a bulk density (aerated) of 81.52 pounds per cubic foot and a bulk density (deaerated) of 89.52 pounds per cubic foot. The deaerated density was obtained by tapping a sample of the material in a graduated cylinder. The material was dried to 0.0% by weight moisture for analysis. The particle sizing was conducted using U.S. standard mesh size.

TABLE IV

| MESH US STD. | OPENING SIZE | PERCENT RETAINED | CUMULATIVE PERCENT RETAINED |
|---|---|---|---|
| 10 | 0.0787" | 001.6% | 001.6% |
| 45 | 0.0138" | 021.1% | 022.7% |
| 80 | 0.0469" | 024.5% | 047.2% |
| 120 | 0.0070" | 014.1% | 061.3% |
| 200 | 0.0029" | 016.7% | 078.0% |

TABLE IV-continued

| MESH US STD. | OPENING SIZE | PERCENT RETAINED | CUMULATIVE PERCENT RETAINED |
|---|---|---|---|
| 325 | 0.0017" | 014.7% | 092.7% |
| Pan | 0.0000" | 007.3% | 100.0% |

The following Table V describes the results of tests of pellets formed by the various waste material compositions of Examples A–E from Table III. The moisture content is in percent by weight.

TABLE V

| Example | Moisture (% in Pellet) | Bulk Density (lbs/cubic feet) | Drop Tests 18" | Drop Tests 72" | Compression Strength (lbs.) | Thermal Shock |
|---|---|---|---|---|---|---|
| A | 11.90 | 87.11 | 13 | 2 | 0.2 | F |
| B | 15.81 | 75.78 | 15 | 3.8 | 0.7 | P |
| C | 18.26 | 80.58 | >50 | * | 1.1 | P |
| D | 15.71 | 82.06 | 37.8 | 6.6 | 1.03 | P |
| E | 17.12 | 76.99 | 44.33 | 4.1 | 1.00 | P |

Pellets ranging from 3/8 to 1/2 inch in size (e.g., diameter) were easily prepared in the compositions of all Examples. The pellets of Examples A–C were formed using a Model DP14 "AGGLO-MISER" laboratory size pelletizer having a 1/16 horsepower drive motor, a pan speed of 21 rpm, a 6 inch pan depth and a 14 inch pan diameter. The pellets of Examples D and E were formed using the same equipment as the pellets of Examples A–C at a pan speed of 28 rpm.

The drop tests were conducted by determining the average number of times a pellet was dropped from a height of 18 or 72 inches until it fractured. This test was conducted to simulate the drop the pellets must be able to withstand during the reduction process, such as the drop onto the hearth of the rotary hearth furnace. The 72 inch drop test for the pellets of Example C resulted in the pellets flattening out on the first drop. The compression strength was determined by compressing each of the pellets between two plates. External pressure was applied until the pellets fractured. The average value was the pounds of force applied. The thermal shock test was conducted by suddenly exposing wet pellets to a temperature of 1800° F. This test was conducted to simulate the thermal shock properties the pellets must have during the reduction process, such as upon entry into the rotary hearth furnace. Pellets either passed ("P") or failed ("F") this test.

As can be seen from Tables III and V, adding binder improved the drop test results and the compression strength. When no binder other than water was added, the pellets did not have acceptable thermal shock properties, as seen by the pellets of Example A. Using carboxymethyl cellulose binder alone (Examples C and D), rather than bentonite binder alone (Example B), improved the drop test results dramatically, and also improved compression strength.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. A method of agglomerating oil-containing steel mill waste, comprising the steps of combining a first steel mill waste component with a second steel mill waste component to form a mixture, said first waste component comprising non-oily steel mill waste having a moisture content of not greater than about 5% by weight and said second waste component comprising oil-containing steel mill waste, and agglomerating said first waste component and said second waste component.

2. The method of claim 1 comprising combining said first and second waste components in amounts ranging from about 1:5 to about 1:3 parts by weight of said second waste component to said first waste component.

3. The method of claim 1 comprising adding a binder to said mixture.

4. The method of claim 1 comprising conducting said agglomeration in a manner effective to form pellets of at least 1/8 inch in size.

5. The method of claim 1 comprising conducting said agglomeration in a manner effective to form pellets ranging from 3/8 to 1/2 inches in size.

6. The method of claim 1 comprising adding dust or mill scale to said mixture.

7. The method of claim 1 said first and second waste components being generated by operation of a blast furnace, a basic oxygen furnace and rolling mills.

8. A method of agglomerating oil-containing steel mill waste, comprising the steps of
   drying a first non-oily steel mill waste component to a moisture content of not greater than about 5% by weight,
   combining said first waste component with a second steel mill waste component to form a mixture, said second waste component comprising oil-containing steel mill waste, and
   agglomerating said first waste component and said second waste component.

9. The method of claim 8 the waste components being added in amounts ranging from about 1:5 to about 1:3 parts by weight of said second waste component to said first waste component.

10. The method of claim 8 comprising conducting said agglomeration in a manner effective to form pellets of at least 1/8 inch in size.

11. The method of claim 8 comprising conducting said agglomeration in a manner effective to form pellets ranging from 3/8 to 1/2 inches in size.

12. The method of claim 8 comprising adding a binder to said mixture.

13. The method of claim 8 comprising adding dust or mill scale to said mixture.

14. A method of agglomerating oil-containing steel mill waste, comprising the steps of
   drying a first non-oily steel mill waste component to a moisture content of not greater than about 5% by weight,
   combining said first waste component with a second steel mill waste component to form a mixture, said second waste component comprising oil-containing steel mill waste, the waste components being combined in amounts ranging from about 1:5 to about 1:3 parts by weight of said second waste component to said first waste component,
   adding a binder to said mixture, and
   agglomerating said first waste component and said second waste component in a manner effective to form pellets of at least 1/8 inch in size.

15. The method of claim 14 comprising adding dust or mill scale to said mixture.

16. A method of recovering iron from oil-containing steel mill waste, comprising the steps of combining a first steel mill waste component with a second steel mill waste component to form a mixture, said first waste component comprising non-oily steel mill waste having a moisture content of not greater than about 5% by weight and said second waste component comprising oil-containing steel mill waste, agglomerating said first waste component and said second waste component in a manner effective to form pellets comprising iron oxides, and reducing the iron oxides in the pellets to iron.

17. The method of claim 16 comprising combining said first and second waste components in amounts ranging from 1:5 to about 1:3 parts by weight of said second waste component to said first waste component.

18. The method of claim 16 comprising adding a binder to said mixture.

19. The method of claim 16 comprising conducting said agglomeration in a manner effective to form pellets of at least 1/8 inch in size.

20. The method of claim 16 comprising conducting said agglomeration in a manner effective to form pellets ranging from 3/8 to 1/2 inches in size.

21. The method of claim 16 comprising adding dust or mill scale to said mixture.

22. The method of claim 16 further comprising melting said reduced pallets.

* * * * *